United States Patent [19]
Chang et al.

[11] Patent Number: 5,962,132
[45] Date of Patent: Oct. 5, 1999

[54] SILICA NANOPARTICLES OBTAINED FROM A METHOD INVOLVING A DIRECT CURRENT ELECTRIC ARC IN AN OXYGEN-CONTAINING ATMOSPHERE

[75] Inventors: Robert Pang Heng Chang, Glenview; Jeffrey Michael Lauerhaas; Tobin Jay Marks, both of Evanston, all of Ill.; Udo C. Pernisz, Midland, Mich.

[73] Assignee: Northwestern University, Evanston, Ill.

[21] Appl. No.: 09/004,198

[22] Filed: Jan. 8, 1998

Related U.S. Application Data

[62] Division of application No. 08/870,015, Jun. 5, 1997, Pat. No. 5,770,022.

[51] Int. Cl.$^6$ .............................. B32B 5/16; C01B 15/14; C01B 33/12
[52] U.S. Cl. .......................... 428/402; 204/164; 423/325; 423/335; 428/404; 428/704
[58] Field of Search ............................. 204/164; 423/335, 423/325; 428/402, 403, 404, 704

[56] References Cited

U.S. PATENT DOCUMENTS

| | | | |
|---|---|---|---|
| 3,900,762 | 8/1975 | Sheer et al. ........................ | 315/111.01 |
| 4,080,550 | 3/1978 | Sheer et al. ........................ | 315/111.21 |
| 5,009,703 | 4/1991 | Arvidson ...................................... | 75/10 |
| 5,028,267 | 7/1991 | Lane et al. ............................. | 106/287.1 |
| 5,204,581 | 4/1993 | Andreadakis et al. ................... | 313/336 |
| 5,309,874 | 5/1994 | Willermet et al. .................... | 123/90.51 |
| 5,660,895 | 8/1997 | Lee et al. ................................. | 427/579 |
| 5,792,679 | 8/1998 | Nakato .................................... | 438/162 |

*Primary Examiner*—Hoa T. Le
*Attorney, Agent, or Firm*—Welsh & Katz, Ltd.

[57] ABSTRACT

A method of making silicon oxide nanoparticles possessing photoluminescence in the blue and green part of the visible spectrum when irradiated with ultraviolet (UV) light. The silicon oxide nanoparticles are formed in a chamber containing a direct current (dc) electric arc that generates a plasma in an oxygen-containing atmosphere. In the chamber, silicon is used as the anode, and the cathode can be copper (Cu) or tungsten (W). The use of silicon as an electrode is enabled by doping silicon with boron to a sufficiently high electronic conductivity, and orienting the two electrodes vertically in the chamber, so that the silicon anode is lowermost to contain silicon in the anode when it melts and vaporizes in the arc. The silicon oxide nanoparticles are collected on a cold plate adjacent to the arc.

8 Claims, 1 Drawing Sheet

SILICA NANOPARTICLES OBTAINED FROM A METHOD INVOLVING A DIRECT CURRENT ELECTRIC ARC IN AN OXYGEN-CONTAINING ATMOSPHERE

CROSS-REFERENCE TO RELATED APPLICATIONS

This application is a division of our prior patent application U.S. Ser. No. 08/870,015, filed on Jun. 5, 1997, now U.S. Pat. No. 5,770,622 entitled "Method of Making Silica Nanoparticles", which prior application is assigned to the same assignees as the present application.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention is directed to a method of making silicon oxide nanoparticles from silicon by utilizing a direct-current electric arc to generate the nanoparticles. The term silicon oxide is used herein to describe compounds with the empirical formula $SiO_x$ where x is less than or equal to two, as well as compounds described as silica.

Silicon-based luminescent species have spurred a great deal of scientific and technological study in the past five years. One such material is a weblike silica network consisting of nanometer-sized particles that photoluminesce in the blue region of the visible spectrum. This particular species and methods for its preparation are described in U.S. Pat. No. 5,580,655 (Dec. 3, 1996), jointly assigned to Virginia Commonwealth University, Richmond, Va., and Dow Corning Corporation, Midland, Mich.; hereafter referred to as the '655 patent.

Silica nanoparticles according to the '655 patent are prepared by laser ablation of silicon in an oxygen containing atmosphere. However, according to our invention, a simplified, improved process has been developed to produce luminescent nanoparticle silicon oxide. Our alternative process is cost-effective in terms of equipment and production through-put. Additional versatility is also gained with our invention by the ability to produce materials luminescing from blue to green to yellow-green. Transmission Electron Microscopy (TEM) of the luminescent $SiO_x$ powder shows that the main structure is an amorphous network of $SiO_x$, but in some cases silicon nanoparticles less than about 5 nanometer in average particle diameter are present in the matrix as well. The photoluminescence is visible to the naked eye, and the material has the advantage of being environmentally stable and environmentally compatible.

BRIEF SUMMARY OF THE INVENTION

The problem solved by our invention is production of visibly luminescent silicon oxide nanoparticles by a more cost-effective technique than previous methods. For example, as noted above, the '655 patent utilizes laser ablation to generate luminescent silica nanoparticles, but that type of equipment and the time involved to use such equipment to produce nanoparticle silica has been found to be prohibitive in terms of large scale commercial production.

According to our invention, however, both an equipment cost reduction and a more efficient production technique have been realized by utilization of a modified direct-arc chamber design to generate the luminescent silica nanoparticles. Thus, the cost has been reduced by requiring only a simple dc power supply to drive the electric arc. In the '655 patent, in contrast, a yttrium-aluminum-garnet-neodymium (YAG—Nd) laser is required to vaporize silicon, and the laser ablation technique produces less than about ten milligrams of material in a 2–3 hour period. The dc powered electric arc system described herein produces about the same amount of material in less than 2 minutes, and can in principle, be readily scaled to produce larger commercial quantities.

These and other features and objects of our invention will become apparent from a consideration of the detailed description.

DETAILED DESCRIPTION OF THE INVENTION

Figure 1:
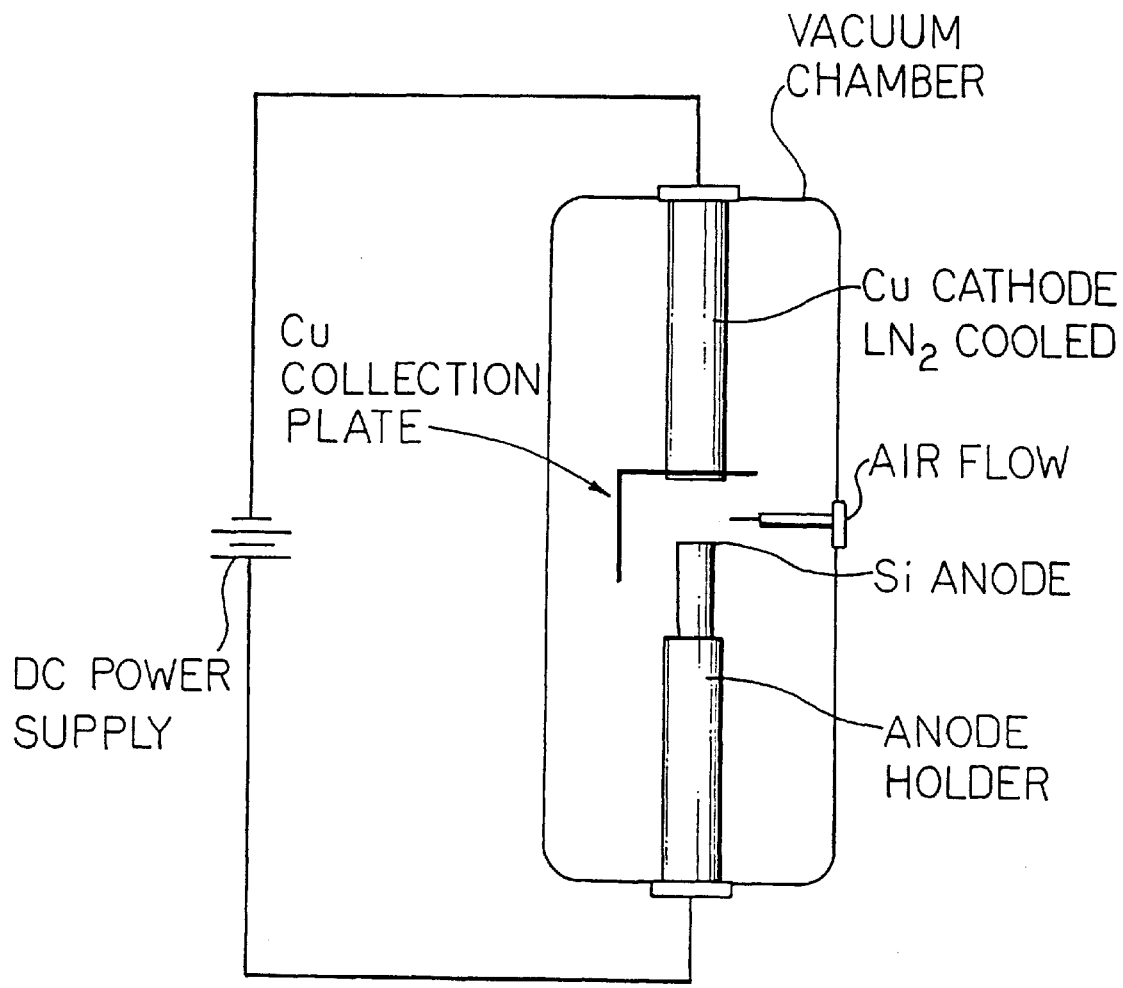
FIG. 1 is a pictorial representation of a vertically arranged direct current electric arc chamber suitable for the generation of silicon oxide nanoparticles according to the method of our invention.

With reference to FIG. 1 in the drawing, a modified direct-arc furnace design is shown which utilizes a system without a carbon electrode. In the figure, a silicon (Si) anode and a copper (Cu) cathode are housed in a vacuum chamber. Typically, the silicon anode and the copper cathode are spaced about one millimeter apart in the vacuum chamber. Generally, anodes of about 12 millimeter in diameter and about 15 millimeter in length, and cathodes of about 25 millimeter in diameter and about 100 millimeter in length, are sufficient for most applications. The vacuum chamber and the silicon anode holder are water-cooled. The vacuum chamber includes a mechanism for providing a regulated gas flow which is necessary to establish the gaseous environment in the vacuum chamber. Power to drive the arc is supplied by a dc power supply having a capacity of generating 40 volt, 250 ampere. The dc power supply is typically operated at about 20 volt and 100 ampere for most applications.

The copper cathode can be liquid nitrogen ($LN_2$) cooled. Without $LN_2$ cooling, the dc electric arc can be maintained for only a few seconds. With $LN_2$ cooling, however, the dc electric arc will last for several minutes, thereby increasing the amount of silicon available for the reaction. $LN_2$ cooling also helps to quench or impede the growth of the arced silicon oxide nanoparticles resulting in a silicon oxide species with nanoscopic dimensions. A copper collection plate in thermal contact with the cathode is located adjacent to the dc electric arc. This arrangement facilitates the rapid quenching and collection of the silicon oxide nanoparticles.

A dc electric arc arrangement such as depicted in FIG. 1 has been found to be more versatile than the laser ablation system of the '655 patent. This is for the reason that silicon oxide nanoparticles, and silicon oxide nanoparticles containing silicon inclusions of nanometric size, can be generated depending upon the arcing conditions. For example, TEM analysis has shown that a luminescent powder according to our invention can constitute either pure amorphous $SiO_x$, or a mixture of nanocrystalline silicon embedded in an amorphous $SiO_x$ matrix. In addition, no special gas supply is required for operation of the dc electric arc. Laser ablation, however, as in the '655 patent, can only be performed under well controlled atmospheres of helium and oxygen at a total pressure of about 500 to 800 Torr.

While high pressure atmospheres will perform in a dc electric arc as well, such high pressure atmospheres are not required, and a dc electric arc simplifies the procedure in that it can be carried out using air at various pressures from 50 to 760 Torr. It is only required that oxygen be present in the gaseous atmosphere in the vacuum chamber.

Although there do exist other methods for producing luminescent silicon oxide, such methods suffer from similar disadvantages in that they are expensive alternatives from the standpoint of being viable commercially, or such methods result in very low yields. Some of these methods are gas evaporation, silicon implantation into $SiO_x$, and plasma enhanced chemical vapor deposition.

The following example is set forth to illustrate our invention in more detail.

EXAMPLE

Using an apparatus as generally depicted in FIG. 1, two different anodes were employed to produce luminescent silicon oxide nanoparticles. One anode consisted of an anode holder made of tungsten which was filled with silicon powder. The silicon powder had a purity of 99.999% and a particle diameter of greater than 60 nanometer. The other anode consisted of an anode holder made of graphite which contained a silicon rod doped with boron having a diameter of 12 millimeters and a resistivity of 0.02–0.03 ohm centimeter. Other dopants such as phosphorus and other elements of Group III and V can also be used.

The results from several experiments are summarized in Table I in which PL is the abbreviation for photoluminescence.

TABLE I

| Anode | Carrier Gas | Pressure Torr | Results |
|---|---|---|---|
| 1. Si Powder | He | 100 | Green PL |
| 2. Doped Si Rod | He | 5 | No PL |
| 3. Doped Si Rod | $H_2$ | 20 | No PL |
| 4. Doped Si Rod | $He/O_2$ (5% $O_2$) | 50 | Blue/Green PL |
| 5. Doped Si Rod | $He/O_2$ (25% $O_2$) | 50 | Blue/Green PL |
| 6. Doped Si Rod | $He/O_2$ (50% $O_2$) | 50 | Blue/Green PL |
| 7. Doped Si Rod | $He/O_2$ (75% $O_2$) | 50 | Blue/Green PL |

In an additional experiment, the vacuum chamber was filled with air at atmospheric pressure, and flow for a gas jet was provided by a cylinder of compressed air. After arcing and allowing the cathode to warm to room temperature, $SiO_x$ powder was collected from the copper collection plate.

The dc electric arc system used in these experiments for producing nanoparticle silicon oxide had a vertical anode/cathode configuration as shown in FIG. 1. The vacuum chamber was water cooled and filled with carrier gases, such as helium, hydrogen, mixtures of helium and oxygen, or air. The vacuum chamber was operated under static conditions, i.e., there was no gas flow during the arcing phase. For the one anode configuration, a tungsten rod with a diameter of 13 millimeter was drilled with a 6 millimeter hole, and the tungsten rod was filled with silicon powder. When a silicon rod was used, the silicon rod was held in a graphite anode holder, and the silicon rod itself functioned as the anode. The cathode material was tungsten for the silicon powder and copper for the silicon rod. The dc power supply was operated at about 20 volt and 100 ampere. The total arcing time was less than two minutes for each of the experiments carried out and shown in Table I.

The dc electric arc was found to be intermittent in operation, and produced arcing areas that moved from one region of the electrode to another. However, the entire system remained cool by having the arc turn on and off in this intermittent fashion. Thus, the collection region in the vacuum chamber remained cool, and this enabled the arced-derived materials to be continuously and rapidly quenched. In fact, the most luminescent materials produced, collected not more than about three centimeters from the anode and cathode regions in the vacuum chamber. In some cases, it was observed that black material formed on the wall of the vacuum chamber, but this was further away from the arcing region. To the naked eye, no visible photoluminescence could be observed from 7–8 centimeter away from the arcing region. In all of the arc experiments with an oxygen-containing atmosphere, blue and green luminescent materials were obtained in approximately the same yield.

The fact that nanoparticle $SiO_x$ was also obtained using a tungsten anode filled with silicon powder in a helium atmosphere, reveals that only small amounts of oxygen are actually required to form the present silicon oxide nanoparticles. Thus, the base pressure of the vacuum chamber before filling with carrier gas was typically about 15 Torr, which is a high enough pressure for some residual oxygen to exist.

The analysis of arced materials prepared in the above EXAMPLE and as shown in Table I was obtained as described hereinafter.

Photoluminescence (PL) Analysis

Excitation was provided by a hand-held UV lamp (i.e., $\lambda$ excitation of 256 nanometer, 650 $\mu W/cm^2$, UVP Model UVGL-25 Mineral Light Lamp). Visual observation of white regions under UV excitation on the anode and cathode revealed blue and green luminescent areas as shown in Table I. Analysis using a Jarrell-Ash Monochromator and an Optical Multichannel Analyzer produced a photoluminescent spectrum revealing that green photoluminescence occurred with maximum intensity at wavelengths of about 535 and 565 nanometer. An analysis of the photoluminescence of blue luminescent materials was not conducted.

Transmission Electron Microscopy (TEM) and Electron Energy Loss Spectroscopy (EELS)

These analytical techniques were used as a means of comparing the microstructure of silica nanoparticles prepared according to the '655 patent, and silicon oxide nanoparticles generated according to the method of the present invention. Images of the material according to the '655 patent, and images of the material according to the method of the present invention that was prepared from doped silicon rods in a helium/oxygen atmosphere (i.e., Nos. 4–7 in Table I) are similar. The morphology of both types of materials was that of an amorphous $SiO_x$ network. No obvious isolated regions of nanocrystalline silicon were observed in the samples. However, TEM investigation of the material derived from arc experiments with silicon powder (i.e., No. 1 in Table I) showed that in this case, there was an amorphous $SiO_x$ matrix present within which were isolated regions of nanocrystalline silicon. The particles of the nanocrystalline silicon have an average diameter of less than about 5 nanometer. A TEM of the starting silicon powder (i.e., No. 1 in Table I) however, indicated that the starting silicon powder had a much larger average particle diameter of greater than 60 nanometer. Comparison of the experimental silicon and oxygen EELS spectra to the literature spectra of $SiO_2$ indicated similar profiles.

Scanning Electron Microscopy (SEM)

This analytical technique is complementary to TEM, and is preferred for comparing the large scale morphology of nanoparticulate types of materials. Silica nanoparticles prepared according to the '655 patent, and silicon oxide nanoparticles generated according to the method of the present invention, were found to possess slightly different morphologies. Thus, silicon oxide nanoparticles generated according to the method of the present invention were more bead-like in appearance, and had a particle size in the 50 nanometer range. Silica nanoparticles prepared according to the '655 patent were more web-like, and the particle size was about the same, i.e., about 50 nanometer. The bead-like morphology of our silicon oxide nanoparticles is attributed to a higher density of material deposited in the collection area in the vacuum chamber, allowing for an increased interaction of the deposited material. For silicon oxide material prepared with an arc operated in air, spherical regions of $SiO_x$ were also observed that had diameters ranging from 50 nanometer to 300 nanometer.

Infrared Spectroscopy (FTIR)

This analytical technique was used to compare white powder collected from doped silicon rod anodes according to our invention, with silica nanoparticles of the '655 patent. The comparison showed that the two types of materials were similar, both containing silanol groups ($\equiv$SiOH) and silicon oxide ($\equiv$Si—O—Si$\equiv$) features. However, an absorbance at ~960 $cm^{-1}$ in our silicon oxide nanoparticles, indicated that it has a higher surface area than the silica nanoparticles of the '655 patent.

Silicon oxide nanoparticles prepared according to the present invention are useful as a passive display material. In such utility, they can be incorporated into road signs and lane markers. The silicon oxide nanoparticles also find application in various types of displays as a luminescent coating for improving their visibility.

Other variations may be made in compounds, compositions, and methods described herein without departing from the essential features of our invention. The forms of invention are exemplary only and not intended as limitations on its scope as defined in the appended claims.

We claim:

1. Silicon oxide nanoparticles made by a method comprising generating a direct current electric arc between an anode comprised of silicon and a metal cathode in a chamber containing oxygen, subjecting the silicon of the anode to the plasma generated by the electric arc to vaporize silicon within the chamber, allowing silicon oxide nanoparticles to form in the chamber, quenching the silicon oxide nanoparticles on a surface within the chamber positioned adjacent the silicon anode, and collecting the silicon oxide nanoparticles from the surface.

2. Silicon oxide nanoparticles according to claim 1 in which the anode comprises an electrically conductive silicon rod doped with a dopant selected from the group consisting of the elements of Group III and Group V.

3. Silicon oxide nanoparticles according to claim 2 in which the dopant is boron or phosphorus.

4. Silicon oxide nanoparticles according to claim 1 in which the atmosphere within the chamber comprises a mixture of helium and oxygen, or air.

5. Silicon oxide nanoparticles comprising an amorphous network of $SiO_x$ having silicon nanoparticles embedded in the amorphous $SiO_x$ network where x is less than or equal to two, made by a method comprising generating a direct current electric arc between an anode comprised of silicon and a metal cathode in a chamber containing oxygen, subjecting the silicon of the anode to the plasma generated by the electric arc to vaporize silicon within the chamber, allowing silicon oxide nanoparticles to form in the chamber, quenching the silicon oxide nanoparticles on a surface within the chamber positioned adjacent the silicon anode, and collecting the silicon oxide nanoparticles from the surface.

6. Silicon oxide nanoparticles according to claim 5 in which the anode comprises an electrically conductive silicon rod doped with a dopant selected from the group consisting of the elements of Group III and Group V.

7. Silicon oxide nanoparticles according to claim 6 in which the dopant is boron or phosphorus.

8. Silicon oxide nanoparticles according to claim 5 in which the atmosphere within the chamber comprises a mixture of helium and oxygen, or air.

* * * * *